(12) United States Patent
Balachandra et al.

(10) Patent No.: US 9,227,274 B1
(45) Date of Patent: Jan. 5, 2016

(54) JOINING VIA NANO-SCALE REINFORCED BONDING MEDIA: MATERIALS, PROCEDURES AND APPLICATIONS THEREOF

(71) Applicants: Anagi Manjula Balachandra, Okemos, MI (US); Parviz Soroushian, Okemos, MI (US); Mohammad Sayyar Bidgoli, East Lansing, MI (US)

(72) Inventors: Anagi Manjula Balachandra, Okemos, MI (US); Parviz Soroushian, Okemos, MI (US); Mohammad Sayyar Bidgoli, East Lansing, MI (US)

(73) Assignee: METNA CO

( * ) Notice: Subject to any disclaimer, the term of this patent is extended or adjusted under 35 U.S.C. 154(b) by 0 days.

(21) Appl. No.: 13/963,197

(22) Filed: Aug. 9, 2013

(51) Int. Cl.
*B23K 35/24* (2006.01)
*B23K 35/32* (2006.01)
*B23K 35/02* (2006.01)
*B23K 35/28* (2006.01)
*B23K 35/26* (2006.01)

(52) U.S. Cl.
CPC ........... *B23K 35/327* (2013.01); *B23K 35/0222* (2013.01); *B23K 35/0255* (2013.01); *B23K 35/262* (2013.01); *B23K 35/284* (2013.01); *B23K 35/286* (2013.01)

(58) Field of Classification Search
USPC ........................................................ 438/455
See application file for complete search history.

(56) References Cited

U.S. PATENT DOCUMENTS

| | | |
|---|---|---|
| 5,127,969 A | 7/1992 | Sekhar |
| 7,416,108 B2 | 8/2008 | Philip |
| 2006/0124706 A1* | 6/2006 | Raybould et al. ........ 228/262.72 |
| 2009/0186238 A1 | 7/2009 | Bampton |
| 2011/0115121 A1* | 5/2011 | Cho et al. ...................... 264/241 |
| 2012/0177905 A1* | 7/2012 | Seals et al. .................... 428/221 |

FOREIGN PATENT DOCUMENTS

EP        1759806 A1    3/2007

\* cited by examiner

*Primary Examiner* — Asok K Sarkar

(57) ABSTRACT

Method of joining articles using microscale brazing alloy particles reinforced with slender nanomaterials is described. Surface modified graphite nanomaterials were dispersed in a medium comprised of metal alloy particles, this dispersion was introduced at the interface between the joining articles followed by heating under ultra high vacuum. The nanomaterial-to-metal alloy surface contacts were enhanced by at least one of fusion, embedment and chemical reaction phenomena under high temperature and ultra high vacuum yielding true nanocomposite at the interface. The fusion, embedment and chemical reaction phenomena enhance at least one of the mechanical, electrical, thermal, durability and functional attributes of these contact points, which translate into improved properties of the joined article. The enhanced contact points enable effective use of the distinct qualities of nanomaterials towards development of joints which offer unique balances of strength, ductility, toughness, energy absorption, thermal stability, weathering resistance and other characteristics.

7 Claims, 9 Drawing Sheets

Ticusil Paste     Nanomaterial Dispersion     Nanomaterial/Ticusil Dispersion

JOINING VIA NANO-SCALE REINFORCED BONDING MEDIA: MATERIALS, PROCEDURES AND APPLICATIONS THEREOF

STATEMENT REGARDING FEDERALLY SPONSORED RESEARCH & DEVELOPMENT

This invention was made with U.S. government support under Contracts FA8650-07-C-3704 by the U.S. Air Force. The U.S. government has certain rights in the invention.

FIELD OF INVENTION

The present invention relates to a method of joining through nano-scale reinforced brazing alloy paste to enhance strength, ductility, energy absorption capacity and toughness of the brazed joints for high temperature aerospace applications.

BACKGROUND OF THE INVENTION

The following is a tabulation of some prior art that presently appears relevant:

U.S. patents

| Pat. No. | Kind Code | Issue Date | Patentee |
|---|---|---|---|
| U.S. Pat. No. 7,416,108 | B2 | Aug. 26, 2008 | Philip |
| U.S. Pat. No. 5,127,969 | A | Jul. 7, 1992 | Sekhar |

U.S. patent application Publications

| Application Number | Kind Code | Publication Date | Applicant |
|---|---|---|---|
| US 2009/0186238 | A1 | Jul. 23, 2009 | Clifford Bampton |

Foreign Patent Application Publications

| Application Number | Kind Code | Publication Date | Applicant |
|---|---|---|---|
| EP1759806 | A1 | Mar. 7, 2007 | Jungbluth et al. |

Non Patent Literature Documents

1. Gavens, A. J. Van Heerden, D. Mann, A. B. Reiss, M. E. and Weihs, T. P., *Effect of intermixing on self-propagating exothermic reactions in Al/Ni nanolaminate foils*. Journal of Applied Physics 2000. 87(3): p. 1255-1263.
2. Barrena, M., Gómez de Salazar, J. and Matesanz, L., *Interfacial microstructure and mechanical strength of WC—Co/90MnCrV8 cold work tool steel diffusion bonded joint with Cu/Ni electroplated interlayer*. Materials & Design, 2010. 31(7): p. 3389-3394.
3. Gain, A. K., et al., *The influence of addition of Al nano particles on the microstructure and shear strength of eutectic Sn—Ag—Cu solder on Au/Ni metallized Cu pads*. Journal of alloys and compounds, 2010. 506(1): p. 216-223.

High-temperature exposures are encountered in many aerospace systems, including reentry and hypersonic air vehicles, and jet engines. Joining of dissimilar (and similar) materials which are exposed to elevated temperature is a key step in manufacturing aerospace components for such applications. These joints should meet certain mechanical and thermal stability requirements, and should also safely accommodate the thermal expansion mismatch caused by dissimilar expansion coefficients and/or temperature gradients of joined parts. The high-temperature joining processes, originally developed for metals and extended to metal-to-ceramic joining, include mechanical fastening, fusion welding, diffusion bonding, friction welding, ultrasonic joining, and brazing.

Most of these joining techniques have drawbacks in terms of the leakage of adhesive and the thermal stability of the joint. Fasteners have the problem of added weight and corrosion problems. Further, for some materials (ceramics to ceramics or ceramics to metals), joining methods are limited due to inherent weakness of the joining substrates that lead to poor machinability and restrict the use of fasteners. Brazing and diffusion bonding are the most commonly employed processes for joining of ceramics and metals. Diffusion bonding involves application of high pressures at elevated temperatures, which could limit their applications due to cost constraints. Brazing is more convenient compared to diffusion bonding as large pressure is not required in joint formation. However, brazed joints are brittle as metal alloys are used in bond formation. Typically, large thermal expansion mismatch between joining articles such as ceramics and metals, caused by relatively large difference between their coefficients of thermal expansion as well as temperature gradients, produces residual thermal stresses within ceramic-to-metal or dissimilar metal joints after high-temperature joining followed by cooling. These stresses compromise the joint strength; high-temperature service exposures could also produce higher thermal stress levels. The effect of residual stresses on joint strength has been demonstrated. For example, it has been shown that alumina-to-superalloy brazed joints provide lower strengths than alumina-to-alumina brazed joints. A strong demand therefore exists for development of a bonding method that can securely bond the parts for more durable strong bonds.

In U.S. Pat. No. 7,416,108 nanoparticles are used as the interface of two articles as a constituent of the braze material, which melt upon temperature rise to join the two articles. This approach takes advantage of the fact that metal nanoparticles have lower melt temperatures compared to the corresponding bulk metals. The use of nanoparticles thus lowers the brazing temperature; after melting, however, the nanoparticles would no more exist as nanomaterials. The present invention employs slender nanomaterials in lieu of nanoparticles, and such slender nanomaterials would preserve their nanoscale geometry after joining resulting strong conformable joint.

U.S. Pat. No. 5,127,969 discloses a method of making reinforced composite solder, brazing or welding material through incorporation of graphite, silicon carbide, a metal oxide, an elemental metal or metal alloy in particulate or fibrous form. This invention does not incorporate any nanomaterial in the brazing media.

Patent Application No. EP1759806A1 presents a crack repair method utilizing brazing through incorporation of same metal nanoparticles as in brazing medium. This invention differs from the current invention as no nano features are retained after the repair is been done.

NanoFoil is a new class of nano-engineered material, fabricated by vapor-depositing thousands of alternating nanoscale layers of aluminum and nickel. When activated by a small pulse of local energy from an electrical, optical or thermal source, the foil reacts to precisely deliver localized heat, and then cooling equally quickly. NanoBond is reactive joining process, utilizing NanoFoil to act as a local heat source for room temperature soldering of both similar and dissimilar materials (Gavens, A. J., et al., *Journal of Applied Physics* 87(3) 1255-1263 (2000)).

Barrena et. al. investigated a high temperature joining method between a cemented carbide (WC-15% Co) and a cold work tool steel (90MnCrV8), which involved diffusion bonding in vacuum using a ductile interlayer of Ni—Cu. Due to the substantial difference between thermal expansion coefficients in substrates, the interlayer was selected as its thermal expansion occurs between those of cemented carbides and steels. High strength of such joints at elevated temperatures was shown in their investigation (Barrena, M., et al., *Materials & Design* 31(7) 3389-3394 (2010)).

Gain et al. proposed introduction of Al nanoparticles into Sn—Ag—Cu solder alloy in order to enhance shear strength of low temperature joints. Strength of the bulk solder was enhanced by the formation of fine Sn—Al—Ag intermetallic particles as well as the controlled fine microstructure after long-term aging. The failure mode of Sn—Ag—Cu solder joints containing Al nanoparticles appeared to be ductile fracture with very rough dimpled surfaces due to the formation of fine Sn—Al—Ag intermetallic compound particles at the top surface of Sn—Ni—Cu intermetallic compound layer (Gain, A. K., et al., *Journal of alloys and compounds* 506(1) 216-223 (2010)).

BRIEF SUMMARY OF THE INVENTION

Current invention relates to joints fabricated between similar or dissimilar substrates through nano-scale reinforced brazing alloy particulate medium to enhance strength, ductility, toughness, and energy absorption capacity of the fabricated joints. These joints have applications in aerospace and other engineered structures where thermal stability of the joint is a consideration. Graphite nanomaterials and brazing alloy paste (bonding medium comprises brazing alloy particles) were used as the bonding medium in lieu of brazing alloy sheet. Utilization of high aspect ratio graphite nanomaterials render ductility to the joint, which in turn helps with overcoming the adverse effects of stresses developed due to thermal expansion mismatch of the dissimilar materials joined. FIG. 1 schematically shows the fabrication of joint through nano-scale reinforced bonding medium.

The present invention makes effective use of graphite nanomaterials towards improving the performance of structural joints for high temperature applications.

The novel approach brings about multi-faceted improvements in the performance characteristics of a traditional braze alloy paste through introduction of graphite nanomaterials. The addition of graphite nanomaterials enhances the mechanical properties, toughness, ductility and energy absorption capacity of the brazed joints.

The present invention also brings multi-functionality into the joint, rendering novel features to the article.

Another feature rendered by nano-scale reinforcement to brazed joints is the rise in thermal and electrical conductivity. This may even lower the thermal stresses, and reduce the fabrication cost. Addition of nanomaterials does not alter the manufacturing process, is easy to scale-up, and is cost-effective. The newly developed nano-braze joints transforms traditional braze joints into tougher, stronger and more ductile joints without adding any additional weight or carrying a significant cost penalty.

BRIEF DESCRIPTION OF THE SEVERAL VIEWS OF THE DRAWINGS

Accompanying drawings help with explaining the invented nano-scale reinforced brazed joints, materials and procedures for making them, and their applications and performance. The accompanying drawings are only for the purpose of illustrating the embodiments of the invented methods, and not for the purpose of limiting the invention.

DETAILED DESCRIPTION OF THE INVENTION

Current invention relates to a method of joining two or more articles through a bonding medium enhanced by graphite nanomaterials, the method comprising:

(i) dispersion of graphite nanomaterials comprising at least one of carbon nanotubes and carbon nanofibers within a volume which includes a dispersant and at least one of particles of said bonding medium, with the weight ratio of the nanomaterials to said particles ranging from 0.05% to 0.15%, with surfaces of said nanomaterials modified in order to facilitate dispersion of the nanomaterials and their interfacial interactions with said bonding medium;

(ii) application of said dispersion incorporating nanomaterials and particles on at least one joining surface of said articles, and heating the applied dispersion in order to remove any volatile constituents;

(iii) bringing the joining surfaces of said articles into contact;

(iv) heating the contacting surfaces under reduced pressure in order to melt said particles, with the molten medium wetting the joining surfaces and the nanomaterial surfaces; and (v) cooling the contacting surfaces to join said articles via the medium which is solidified, bonded to joining surfaces, and enhanced by nanomaterials.

Figure 1:
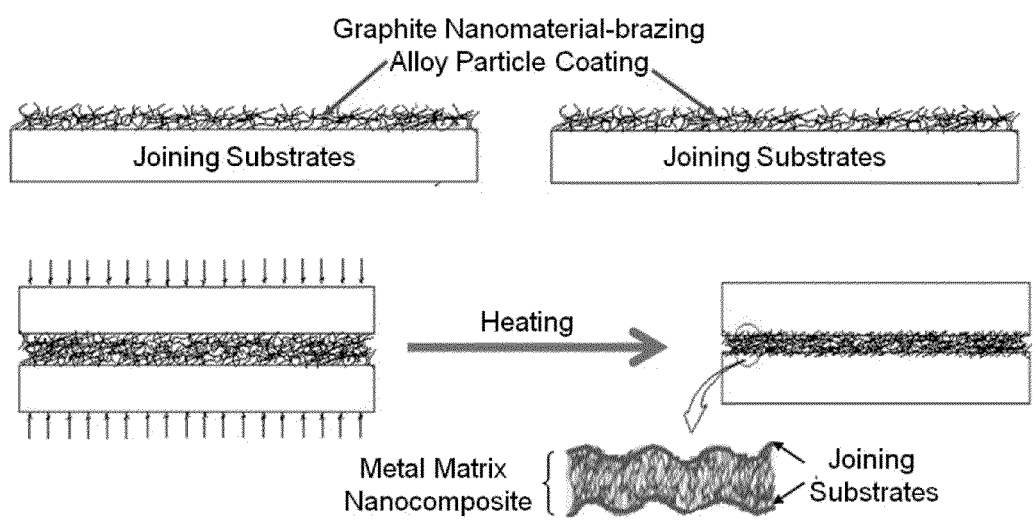
FIG. 1 Schematic representation of joint fabrication process through nano-scale reinforced bonding media.

This joining of two or more articles via nano-scale reinforced bonding media is schematically shown in FIG. 1.

The term "dispersion" means uniformly, individually distributed particles in a dispersant. Dispersion comprising graphite nanomaterials and bonding medium in a dispersant, preferably graphite nanomaterials are carbon nanotubes or carbon nanofibers. Carbon nanofibers, vapor grown highly graphitic, low cost, tubular carbon structures. Carbon nanofibers are commercially available as Pyrograf®-III with diameters ranging from 70 and 200 nanometers and a length of the as-produced fiber estimated to be 50-200 microns. CNF are much smaller in diameter than conventional continuous or milled carbon fibers (5-10 microns) but significantly larger than carbon nanotubes. Carbon nanotubes are single-walled, multi-walled with hollow or bamboo structure.

Surfaces of said carbon nanomaterials are modified to improve the interfacial interactions with bonding medium through following one of the methods: (i) coating with at least one of copper, nickel and silver via electroless deposition; and (ii) introduction of at least one of carboxyl and hydroxyl functional groups on the surface of carbon nanomaterials via chemical functionalization. Coating or metallization of carbon nanomaterials with metals has been done using a two-step process comprising of surface activation with noble metals such as Pd or Pt, which serves as a catalyst for the second step, followed by the electroless deposition of respective metal.

Dispersion of nanomaterials, and said bonding medium in a dispersant is achieved via sonication. Typically sonication can be achieved using bath sonicator, such as those by Branson, or using sonicating horn design from companies such as Hielscher Inc or Misonix, Inc. Dispersant allows uniform distribution of nanomaterials these include at least one of surfactants, polyelectrolytes and organic solvents. Surfactants are at least one of the following sodium dodecyl sulfate (SDS), Triton X-100, sodium dodecylbenzenesulfonate (SDBS), sodium dodecyl sulfonate (SDSA), sodium n-lauroylsarcosinate, sodium alkyl allyl sulfosuccinate, polystyrene sulfonate (PSS), dodecyltrimethylammonium bromide (DTAB), cetyltrimethyl ammonium bromide (CTAB), Tween, and poly(vinylpyrrolidone) (PVP). Polyelectrolytes are at least one of the following poly (acrylic acid) (PAA), polystyrene sulfonate (PSS), poly(ethylene imine) (PEI) and polyallyl amine hydrochloride (PAH). Organic solvents are one of the following isopropyl alcohol (IPA), ethanol, methanol, tetrahydrofuran (THF), dimethyl formmamide (DMF) and toluene.

The term "bonding medium" means a material that allows linking, binding, fastening, or holding two surfaces permanently through melting upon heating and consolidating upon cooling. Bonding medium comprising particles of brazing alloys of at least one of the metals silver, copper, titanium, tin, gold and nickel with particle size ranging from 1 micron to 1 millimeter.

The term "joining surfaces" meaning any material composed of metallic or inorganic or organic or combination with a surface allowing linking of nano-reinforced bonding media. Preferably joining surfaces are made of at least one of metals, metal alloys, super alloys, metal matrix composites, ceramics, ceramic matrix composites, carbon and carbon composites.

Having described the invention, the following examples are given to illustrate specific applications of and provide a better understanding of the invention. These specific examples are not intended to limit the scope of the invention described in this application.

EXAMPLE 1

Nano-brazed joints were fabricated using copper-coated carbon nanotube (CuCNT) or copper-coated carbon nanofiber (CuCNF) and brazing alloy bonding medium. Brazing alloy (TiCusil®) paste comprising of particles ranging from 1 micrometer to 1 millimeter. Ticusil® paste was made of copper, silver and titanium. Copper coating on carbon nanotubes or carbon nanofibers was carried out through electroless deposition method. The concentration of carbon nanomaterial in brazing alloy was 0.5-1 wt. %. Carbon nanotubes were copper-coated and functionalized. Carbon nanofibers were used in the following forms: (i) functionalized (CNF—F); (ii) copper-coated and functionalized (CuCNF—F); (iii) functionalized, copper-coated and functionalized (Cu—F—CNF—F). Hybrid coatings of modified graphite nanomaterils/TiCusil® were introduced on to the faying surfaces of ceramic matrix composites (CMC), supper alloy inconel prior to fabrication of brazed joints. The desired structure of nano-brazed inconel-to-inconel joints provided the basis to undertake mechanical evaluation of these nano-brazed joints by performing single-lap shear tests.

Figure 2:
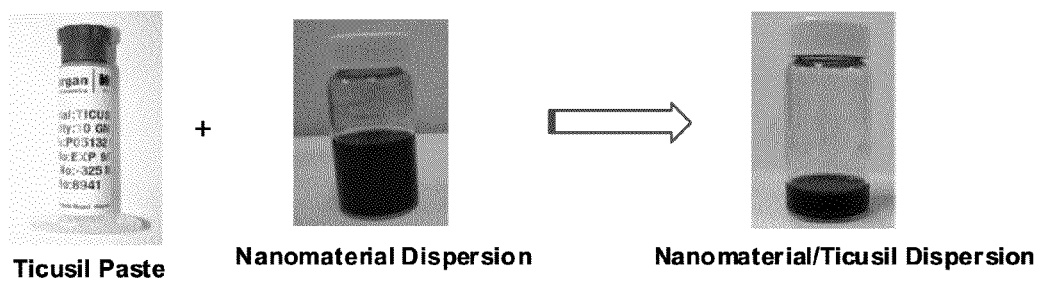
FIG. 2 Preparation of different carbon nanomaterial dispersion with brazing alloy paste.

Dispersion of Graphite Nanomaterials in Ticusil Brazing Alloy Paste 0.1 g of Ticusil® paste was mixed with 1 mL of copper-coated graphite nanomaterial (either CuCNT or CuCNF) or functionalized copper-coated graphite nanomaterials (either CuCNT-F or CuCNF—F), noting that 0.02 g of CNT or CNF was originally dispersed in 20 mL of isopropyl alcohol (IPA). The mixture was diluted to 5 mL with isopropyl alcohol (IPA). The dispersion was prepared by 10 minutes of homogenization followed by 10 minutes of sonication (sonic probe), with procedure was repeated two more times FIG. 2 shows the dispersion of CuCNT (or CuCNF) in Ticusil® paste.

Functionalization of Copper-Coated Carbon Nanomaterials

In our approach to functionalization of CuCNT (or CuCNF), 0.02 g of 11-Mercapto-1-undecnol (MUD) was added to 20 ml of ethanol, and the mixture was bath-sonicated for 5 minutes; 0.02 g of CuCNT (or CuCNF) was then added, and stirred overnight. The dispersion was centrifuged with ethanol twice to remove the excess MUD.

Deposition on Surfaces

Figure 3:
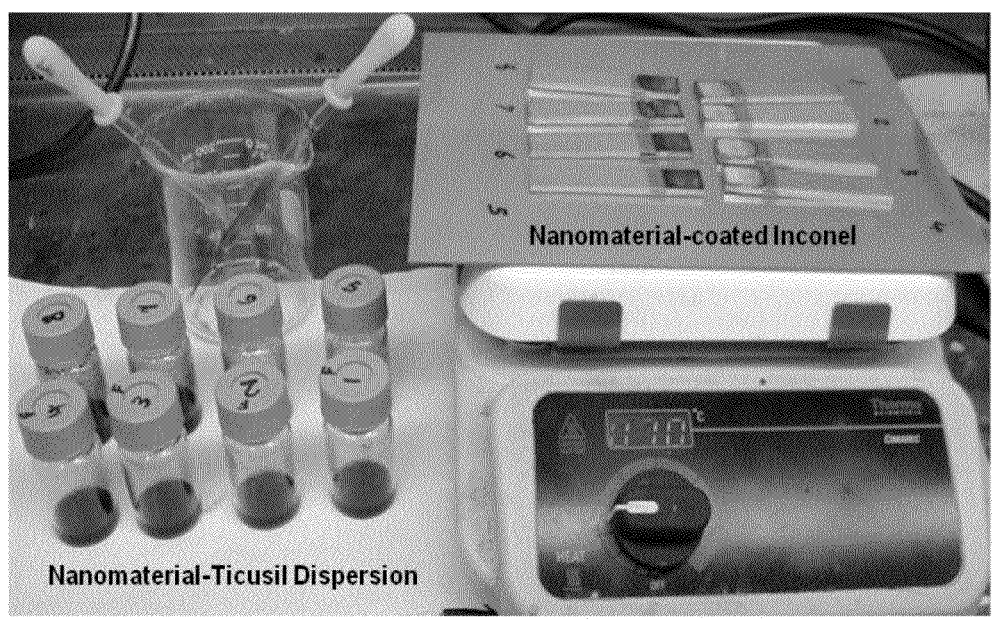
FIG. 3 Solvent casting of nanomaterials-Ticusil dispersion.

Solvent-casting or spraying was employed for deposition of graphite nanomaterials in Ticusil® paste. FIG. 3 shows the solvent-casting process, this process comprised of: (i) introduction of a layer of CuCNT/Ticusil® or CuCNF/Ticusil® dispersion in IPA; and (ii) evaporation of solvent through heating at 60° C. Two steps were repeated until the required amount of nano-reinforced bonding medium was deposited.

Nano-Brazed Joint Fabrication

Figure 4:
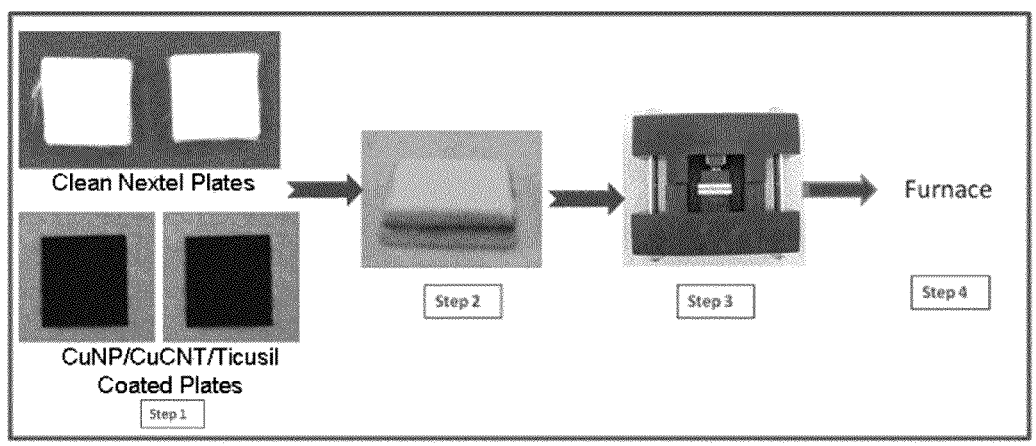
FIG. 4 Steps involved in processing of nano-braze joints with different substrates.

Joints were made either between CMC and inconel or CMC and CMC or inconel to inconel. The steps involved in forming the high-temperature nano-engineered joints are presented in FIG. 4. The joining plates were assembled with the coated surfaces (hybrid coatings of CuCNT/TiCusil® or CuCNF/TiCusil®) placed against each other; the assembly was pressed within a stainless steel clamp, and heated in a vacuum furnace.

Microscopic Evaluation of Nano-Brazed Joints

Figure 5:
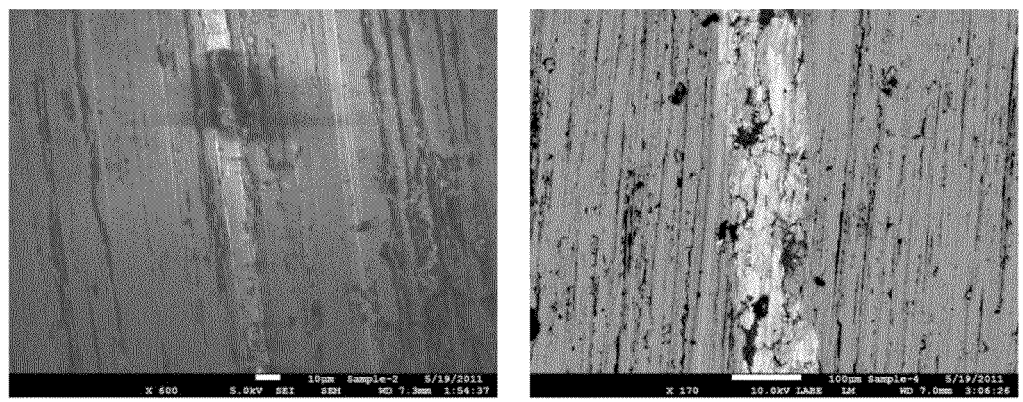
FIG. 5 SEM microscope images (cross-sectional views) of different locations of the nano-braze Inconel-to-Inconel joint fabricated with 5 (CuCNT-F/Ticusil®) brazing alloy (scale bar is 0.05 inches).
Figure 6:
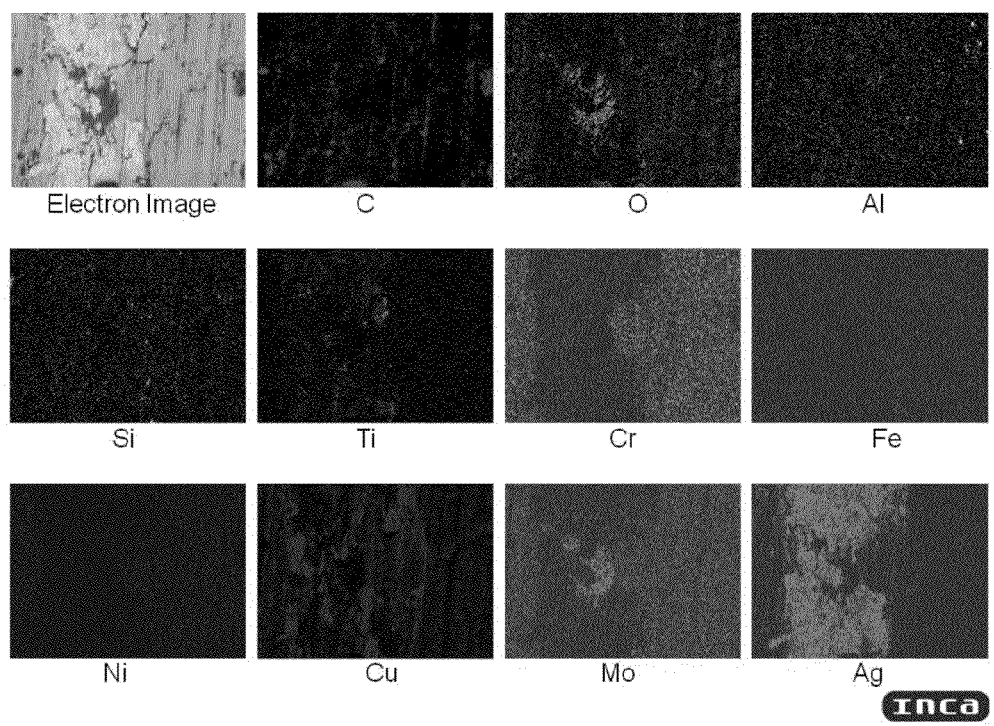
FIG. 6 EDS elemental maps for cross-section of the nano braze inconel-to-inconel joint fabricated using copper-coated carbon nanomaterials/Ticusil®.

Fabricated joints were sectioned and characterized through microscopy. Scanning electron microscopy (SEM) and Energy Dispersive X-ray Spectroscopy (EDS) analysis were undertaken to provide insight into the structure and composition of the nano-brazed joints. FIG. 5 shows SEM micrographs of cross-sections of nano-brazed joints. FIG. 6 shows EDS elemental mapping of cross-sections nano-brazed joints. These EDS elemental maps indicated that carbon is well distributed on the joint area. In addition, Cu, Ag and Ti, which were constituents of Ticusil®, were distributed uniformly in the joining interface. These findings indicate that graphite nanomaterials interact well with the Ticusil® brazing alloy medium forming and metal matrix nanocomposite at the joining interface.

Mechanical Evaluation of Nano-Brazed Joints

Figure 7:
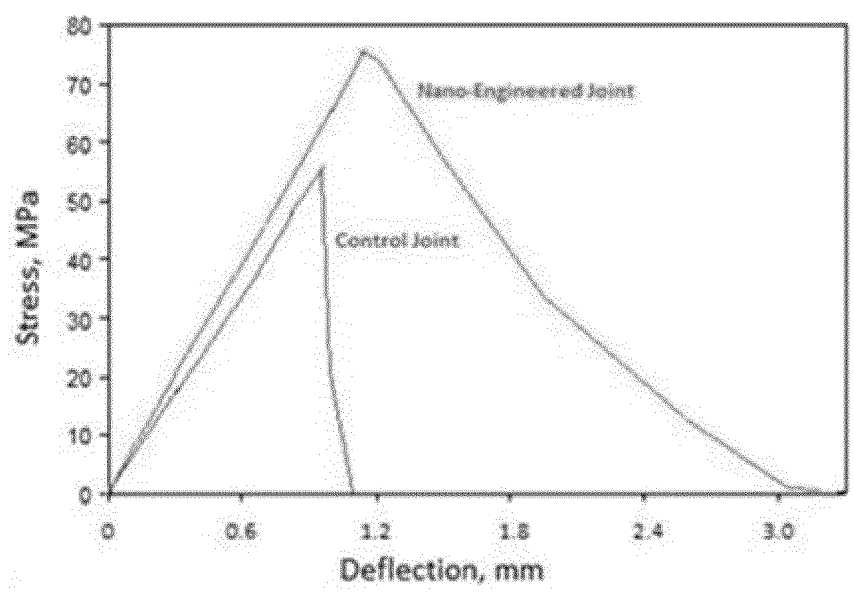
FIG. 7 Comparison of shear stress-deflection behavior of nano braze joint and control joint fabricated similarly but without incorporation of graphite nanomaterials in braze.

The strength and ductility of these nano-brazed joints fabricated with graphite nanomaterials in Ticusil® brazing alloy paste were evaluated by room temperature single-lap shear tests. FIG. 7 shows comparison of shear stress-deflection behavior of nano-brazed and control joints. When compared with control joints, nano-brazed joints provided about 25% higher shear strength as well as improved ductility and energy absorption capacity. For the evaluation of the high-temperature stability joints were tested by high temperature single-lap shear exposing the samples to elevated temperature (>480° C.). Nano-engineered joints fabricated with CNF and Ticusil® brazing alloy paste were evaluated at 480° C. showed that nano-brazed joints were about 25-30% stronger than that of control joints fabricated similarly without use of graphite nanomaterials.

EXAMPLE 2

Joints were fabricated with as produced graphite nanomaterials these include; single-walled carbon nanotubes, multi-walled carbon nanotubes and carbon nanofibers. Two different graphite nanomaterial dispersions were prepared: (1) dispersion 1 comprising graphite nanomaterials; and (2) dispersion 2, comprising nanomaterials and poly(acrylic acid) (PAA, a polymer with uniformly distributed carboxylic acid groups (negative charge moieties along the polymer chain) to facilitate thorough dispersion of nanotubes.

Dispersion 1 was made with 0.02 g of graphite nanomaterials in 10 mL of IPA. Sonication was employed over three hours (in a sonicator bath) to disperse the nanotubes. The dispersion was then centrifuged over 30 minutes in order to separate the supernatant, which was then used in solvent-casting to form the nanotube mat on joining surfaces. Between depositions, the dispersion was kept in the sonicator bath to avoid any agglomeration.

Dispersion 2 used a mixture of 0.02 g of the graphite nanomaterials and 0.02 g of PAA (PAA:nano ratio of 1:1), in 100 mL of IPA. The dispersion was sonicated using a sonic probe at different amplitudes, followed by pulsing at 70% amplitude for two 10-minute intervals, with the whole cycle repeated one more time. The resulting dispersion was centrifuged over 30 minutes, and the supernatant was separated for use in solvent-casting.

Figure 8:
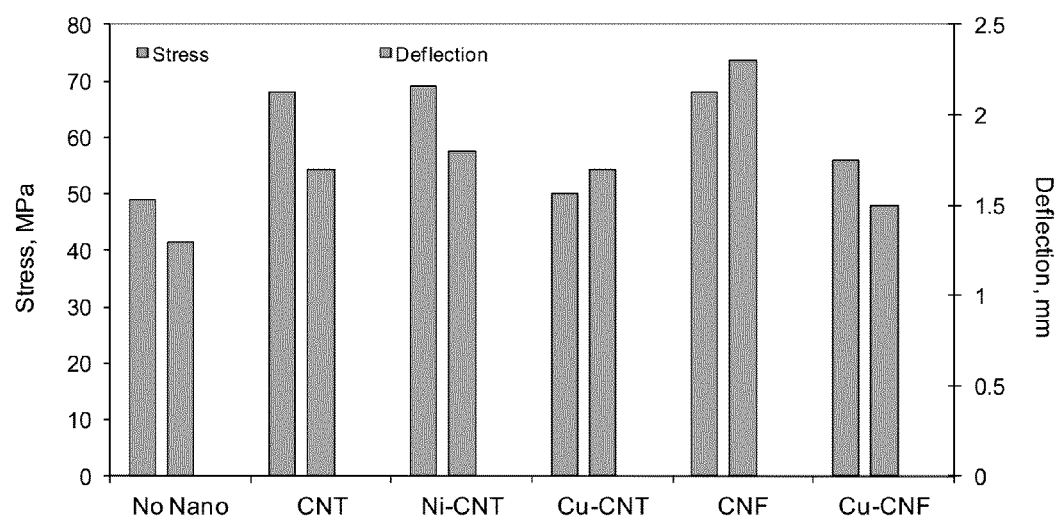
FIG. 8 Strength and deformation capacity of nano-braze joints incorporating different graphite nanomaterials with and without metal coating versus those of the control joint.

Hybrid coating of graphite nanomaterials/TiCusil® was introduced on to the faying surfaces of superalloy (inconel) prior to fabrication of brazed joints. Brazed inconel-to-inconel joints fabrication was carried out as described in EXAMPLE 1. Mechanical performances of the fabricated nano-engineered joints were evaluated in single-lap shear, and results are presented in FIG. 8.

EXAMPLE 3

Brazed inconel-to-inconel joints were prepared with Ticusil® paste and nickel coated carbon nanofiber (NiCNF), and were subjected to high-temperature single-lap shear tests at 480° C. The mean values in test results were compared between control and nano-engineered joints.

Figure 9:
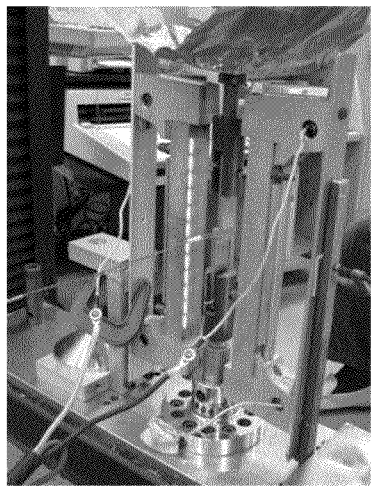
FIG. 9 High-temperature single-lap shear test set-up and comparison of the shear strength obtained at elevated temperature for nano-braze joint incorporation nickel-coated carbon nanotubes and control joints without any graphite nanomaterials.
Figure 9:
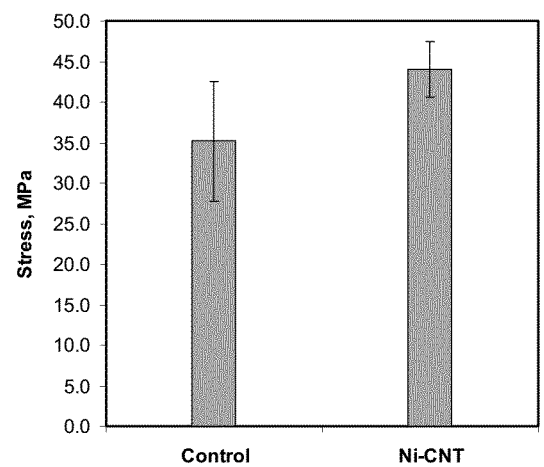

Preparation of the CNF dispersion and its deposition on joining surfaces followed the procedures described in EXAMPLE 1. Briefly, the brazed inconel-to-inconel joints were prepared by application of CNF and Ticusil® paste. These surfaces were pressed against each other, and the assembly was heated above the liquidous temperature of the brazing alloy. During heating molten alloy wet the inconel surfaces and CNF surfaces, upon cooling forming an integrated joint. Control joints were fabricated similarly without the introduction of nanomaterials. Nano-engineered joints, when compared with control joints, provide 30% higher shear strength at room temperature, and 25% greater shear strength at 480° C. High-temperature single-lap shear test set-up and comparison of the shear strength obtained at elevated temperature for nano-braze joint incorporating nickel-coated carbon nanotubes and control joints without any graphite nanomaterials is shown in FIG. 9. Further nano-brazed joints provide more consistent performance characteristics when compared with control joints.

The invention claimed is:

1. Method of joining two or more articles through a bonding medium reinforced by graphite nanomaterials, the method comprising: (i) dispersion of graphite nanomaterials comprising at least one of carbon nanotubes and carbon nanofibers within a volume which includes a dispersant and particles which form said bonding medium via melting during joining at elevated temperature, with weight ratio of the nanomaterials to said particles ranging from 0.05% to 0.15%, with surfaces of said nanomaterials are modified to facilitate dispersion of the nanomaterials and to increase their interfacial interactions with said bonding medium; (ii) application of said dispersion incorporating surface modified nanomaterials, dispersant and particles on at least one joining surface of said articles, and heating the applied dispersion in order to remove any volatile constituents; (iii) bringing the joining surfaces of said articles into contact; (iv) heating the contacting surfaces in order to melt said particles in the bonding medium, with the molten bonding medium wetting the joining surfaces of said articles, and surfaces of said nanomaterials; and (v) cooling the contacting surfaces to join said articles via the reinforced bonding medium which is solidified, bonded to joining surfaces, and enhanced by surface modified graphite nanomaterials.

2. The method of claim 1, wherein said articles are made of at least one of metals, metal alloys, superalloys, metal matrix composites, ceramics, ceramic matrix composites, carbon and carbon composites.

3. The method of claim 1, wherein the particles of said bonding medium are made of at least one of brazing alloys, with particle size ranging from 1 micrometer to 1 millimeter.

4. The method of claim 3, wherein said brazing alloys comprise at least one of silver, copper, titanium, tin, lead, gold and nickel.

5. The method of claim 1, wherein the surfaces of said graphite nanomaterials are modified to improve the interfacial interactions with the said bonding medium by one of methods: (i) coating with at least one of copper, nickel and silver via electroless deposition; and (ii) introduction of at least one of carboxyl and hydroxyl functional groups on to the surface of the graphite nanomaterials via chemical functionalization.

6. The method of claim 1, wherein the dispersant of said bonding medium comprising organic solvent and at least one of surfactants and polyelectrolytes, wherein organic solvent is one of isopropyl alcohol (IPA), ethanol, methanol, tetrahydrofuran (THF), dimethyl formamide (DMF) and toluene; wherein said surfactant comprise at least one of sodium dodecyl sulfate (SDS), Triton X-100, sodium dodecylbenzenesulfonate (SDBS), sodium dodecyl sulfonate (SDSA), sodium n-lauroylsarcosinate, sodium alkyl allyl sulfosuccinate, polystyrene sulfonate (PSS), dodecyltrimethyl ammonium bromide (DTAB), cetyltrimethyl ammonium bromide (CTAB), Tween, and poly(vinylpyrrolidone) (PVP); and wherein said polyelectrolytes comprise at least one of poly (acrylic acid) (PAA), polystyrene sulfonate (PSS), poly(ethylene imine) (PEI) and polyallyl amine hydrochloride (PAH).

7. The method of claim 1, wherein said dispersion comprising said surface modified graphite nanomaterials and said particles in said dispersant is achieved via at least one of sonication and mixing.

* * * * *